June 1, 1926.

W. McCONWAY 1,586,632

METHOD OF PRODUCING METAL BLANKS

Filed Nov. 18, 1922

Inventor

William McConway

By Ritter & Ritter

His Attorneys

Patented June 1, 1926.

1,586,632

UNITED STATES PATENT OFFICE.

WILLIAM McCONWAY, OF PITTSBURGH, PENNSYLVANIA; WM. McCONWAY, JR., EXECUTOR OF SAID WILLIAM McCONWAY, DECEASED, ASSIGNOR TO THE McCONWAY & TORLEY COMPANY, OF PITTSBURGH, PENNSYLVANIA, A CORPORATION OF PENNSYLVANIA.

METHOD OF PRODUCING METAL BLANKS.

Application filed November 18, 1922. Serial No. 601,773.

My invention relates to a method of producing metal blanks, and has for its object to ensure that the metal thereof shall be uniformly good and sound throughout. It is also an object of the invention to attain the desired result by a few simple operations and with a minimum discard of material.

The primary feature of the invention, generally stated, consists in producing a metal blank by a method which involves centrifugally casting a metal member with an opening allowing slaggy matter to be concentrated in the walls of said opening, subsequently pressing the member when heated so as to cause the good clean metal thereof to close the opening and effect an extrusion of the slaggy matter, and thereafter removing the slaggy matter. As will hereinafter appear, there are other features of the invention residing in specific details of the process.

In order that articles which are forged, rolled, pressed or similarly produced from steel or other metal shall be strong, durable and reliable in service, it is important that the blanks or pieces from which they are fabricated shall be sound and free from defects.

In Letters Patent heretofore granted to me, No. 1,177,957, dated April 4, 1916, are disclosed a method and an apparatus for centrifugally casting steel blanks having a central hole or opening therethrough. In a steel member or disk of this character cast centrifugally all slaggy matter becomes concentrated in the walls of the opening. This slaggy matter may be eliminated by simply forcing a broach through the opening in the disk as cast, but such an operation results in the discard of a considerable quantity of sound steel, inasmuch as the slaggy matter is so disposed in the walls of the opening of the disk that the broach in being driven through to remove the slaggy material cuts a quantity of sound steel from the sides of the orifice. By my present invention the slaggy matter may be removed without any broaching operation, loss of good steel is much reduced, and a solid blank or member of clean sound steel, free from air holes, gas or slag pockets, pipes or other imperfections, is produced in which the line of solution of continuity of the metal where the hole in the cast member originally existed is insignificant and negligible.

In the drawings chosen for the purpose of explaining the method of producing a metal blank in accordance with my invention,—

Figure 1:
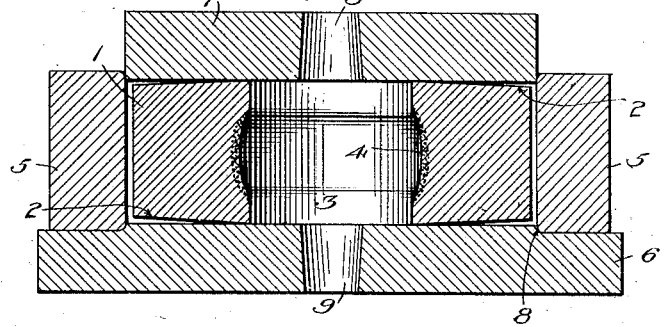
Figure 1 is a sectional view of a cast steel disk or annulus shown as in position to be subjected to pressure in die means effecting the extrusion of slaggy matter.

In the drawings, 1 indicates a cast steel member illustrative of the initial step in the production of a blank by my method of manufacture. As shown, it is preferred to cast the member 1 as a hollow cylinder or perforated disk whose ends may advantageously be slightly tapered, as indicated at 2. The member 1 may be of any size or configuration required and is cast centrifugally so as to effect a concentration of slaggy material on the inner surface of the hole 3 of the disk. As cast centrifugally the slaggy material 4 of the disk 1 is concentrated or disposes itself in the walls of the opening 3 in the general form shown in Fig 1.

When heated the disk is subjected to pressure in extrusion dies to force the slag outwardly through openings in said dies disposed in alinement with the axis of the disk. These dies preferably consist of a solid cylindrical ring 5 with which pressure applying plates or followers 6 and 7, respectively, cooperate. The lower plate 6, forming the base for the circumscribing ring 5, may advantageously have a shoulder or boss 8, fitting closely in the ring so as not only to center the latter but also to prevent escape of the metal of the disk when it is subjected to pressure. The upper follower plate 7 corresponds in form to the inner surface of the cylindrical ring 5, the clearance between the disk and ring being such that no appreciable amount of metal may creep between it and the ring. The plates 6 and 7 are respectively provided with centrally arranged apertures or openings 9 which are somewhat tapered from their inner sides outwardly to enable the disks to be readily stripped or freed from said plates at the completion of the pressing.

Figure 2:
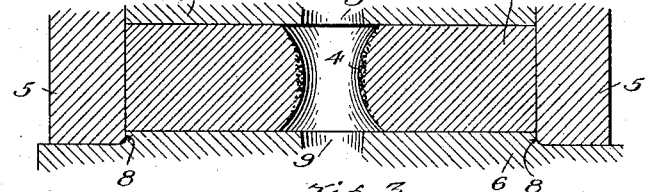
Figure 2 is a detail view corresponding to Fig. 1, but illustrating the manner in which the slaggy matter flows toward the center of the opening in the cast metal member when the latter is subjected to pressure.
Figure 3:
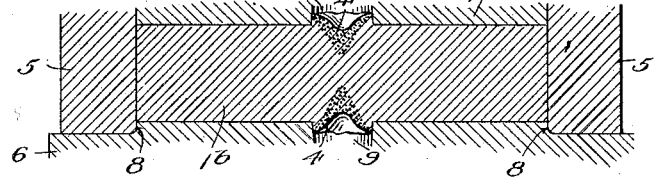
Figure 3 is a view similar to Fig. 2, but illustrating the manner in which continued pressure of the dies causes the sound metal to meet and close the hole in the disk and to drive the slag outwardly.
Figure 4:
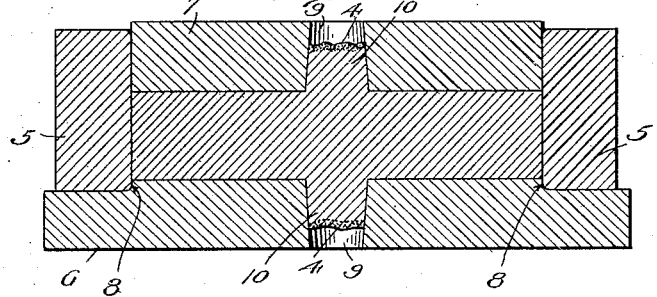
Figure 4 is a sectional view corresponding to Fig. 1 but showing the disk as having been pressed sufficiently to compel the extrusion of the slaggy material in the form of projections extending into orifices in the die members.
Figure 5:
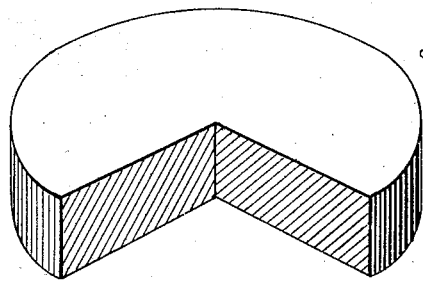
Figure 5 is a perspective view of a finished blank from which a sector has been removed.

When the heated disk has been placed in position in the dies, as shown in Fig. 1, the follower plate 7 is forced towards the lower follower plate 6 by means of a hydraulic press or other suitable means. As the upper follower 7 moves downwardly within the circumscribing ring die 5 the heated metal is caused to flow toward the center of the opening 3 in the disk, thereby effecting bulging of the slag bearing walls of the opening, as illustrated in Fig. 2. At this stage of the pressing operation the disk is in the form 1$^a$. Subsequent application of sufficient pressure to the follower plates 6 and 7 causes sound clean metal to contact or come together at the center of the disk, as shown in Fig. 3, and displace the slag 4 outwardly in the direction of the axis of the opening 3. At this stage the disk is in the form 1$^b$. The pressure applied to the heated disk by the apertured follower plates 6 and 7 is continued to such extent as may be required to cause all slaggy matter to be extruded into the openings 9 of the followers, thus creating projections 10 containing the slaggy matter which extend outwardly from the body of the disk on opposite sides thereof. These projections are subsequently cut off, thereby leaving, as illustrated in Fig. 5, a blank 1$^c$ of sound metal. It is to be understood, of course, that the projections 10 formed by the extrusion of the heated metal into the apertures 9 of the die means need not necessarily extend beyond the body of the disk as far as is shown in Fig. 4, and preferably are only of sufficient length to ensure the removal of all slaggy and imperfect material.

I claim:—

1. The method of producing metal blanks, which involves forming a metal member having an opening therethrough, subjecting said member when heated to pressure causing metal to flow toward the center of and close said opening, and subsequently causing material originally disposed in the walls of said opening to flow in the direction of the axis of said opening.

2. The method of producing metal blanks, which involves centrifugally casting a metal member having an opening therein, and subjecting said member when heated to pressure causing a flow of metal effecting the closing of said opening by metal distinct from the material originally disposed in the walls of said opening.

3. The method of producing metal blanks, which involves forming a metal member having an opening therein, and subjecting said member when heated to pressure causing a flow of the material of which said blank is composed effecting the closing of said opening by metal distinct from the material originally disposed in the walls of said opening with an attendant extrusion in the direction of the axis of said opening of material originally disposed in the walls of said opening.

4. The method of producing metal blanks, which involves centrifugally casting a metal member having an opening therein, and subsequently closing said opening by subjecting said member when heated to pressure causing the extrusion of material originally disposed in the walls of said opening.

5. The method of producing metal blanks, which involves centrifugally casting a metal member having an opening therein, and thereafter subjecting said member when heated to pressure effecting a closure of said opening and the extrusion of a projection containing material originally disposed in the walls of said opening.

6. The method of producing metal blanks, which involves centrifugally casting a metal member having an opening therein, subjecting said member when heated to pressure effecting a closure of said opening by metal distinct from the material originally disposed in the walls of said opening and an attendant forcing toward the ends of said opening of material originally disposed in the walls thereof, and subsequently removing material originally disposed in the walls of said opening.

7. The method of producing metal blanks, which involves centrifugally casting a metal member having an opening therein, and pressing said member when heated in apertured die means to cause material originally disposed in the walls of said opening to be extruded and come to the surface.

8. The method of producing metal blanks, which involves forming a metal member with an opening therethrough in the walls of which slaggy matter is concentrated, subjecting said member when heated to pressure between means having apertures overlapping said opening and continuing said pressure until said slaggy matter is extruded into said apertures, and thereafter removing said slaggy matter.

9. The method of producing metal blanks, which involves forming a metal member with an opening in the walls of which slaggy matter is concentrated, and subsequently pressing said member when heated to cause the good metal thereof to close said opening and force the slaggy matter outwardly in the direction of the axis of said opening In testimony whereof I affix my signature.

WILLIAM McCONWAY.